United States Patent [19]
Ernst et al.

[11] 4,201,424
[45] May 6, 1980

[54] ROLLING BEARING HAVING TWO-SIDED RACE RAILS

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 948,089

[22] Filed: Oct. 2, 1978

[30] Foreign Application Priority Data

Oct. 13, 1977 [DE] Fed. Rep. of Germany ... 7731603[U]

[51] Int. Cl.² ............................................. F16C 29/06
[52] U.S. Cl. ..................................... 308/6 C; 64/23.7
[58] Field of Search ................ 308/6 C, 6 R; 64/23.7, 64/23

[56] References Cited

U.S. PATENT DOCUMENTS

| | | | |
|---|---|---|---|
| 3,512,849 | 5/1970 | Weisel | 308/6 C |
| 3,545,826 | 12/1970 | Magee et al. | 308/6 C |

*Primary Examiner*—Douglas C. Butler
*Attorney, Agent, or Firm*—Daniel M. Rosen

[57] ABSTRACT

In a longitudinally movable rolling bearing having a plurality of endless rows of spherical rolling elements, elongated races are provided for supporting loaded rolling elements against the inner boring of a housing. The radially directed surfaces of the rails are identical, so that the rails may be reversed to prolong the life of the bearing. In one embodiment, the rails are straight in the lengthwise direction, for use in a bearing in a precision machine. In another embodiment of the invention, the rails are convex curved in the lengthwise direction, for use in a bearing requiring compensation for misalignment of a shaft and the housing.

10 Claims, 7 Drawing Figures

ROLLING BEARING HAVING TWO-SIDED RACE RAILS

BACKGROUND OF THE INVENTION

This invention relates to a rolling bearing for longitudinal movement between a shaft and a housing or the like, wherein a plurality of endless rows of rolling elements are distributed about the circumference of the bearing, and wherein the bearing has separate rails for receiving the loads of each of the rolling elements rows.

Rolling bearings of the above type are disclosed, for example, in co-pending U.S. application Ser. No. 821,472 filed Aug. 3, 1977, now U.S. Pat. No. 4,138,167. In this type of bearing one side of the rails have convex curvature in the lengthwise direction, and the opposite sides of the rails are straight in the lengthwise direction. The rails are arranged in the rolling bearing with either their straight side, or with their convex curved side, directed radially outward in the cage shell. The straight sides are directed radially outwardly for use in a precision machine, so that the straight sides closely engage the inner surface of the bore of the housing throughout their extent, to prevent tilting movement of the rails. Alternatively, the convex curved sides of the rails may be directed radially outwardly to engage the inner bore of the housing for use in a less accurate machine, wherein a determined adjustability or tiltability of the rail is desired between the rails and the housing. In this type of bearing, in the event of wear or the appearance of fatigue (i.e. damage due to fatigue of the materials), the rail in use must be substituted by a new unused rail, for continued use of the bearing. This results in a limit on a useful life of the bearing and the useful life of the rail.

BRIEF SUMMARY OF THE INVENTION

The present invention is directed to the production of an improved rolling bearing of the above type, in which the useful life of the bearing is increased. The improved bearing is suitable for use either in precision machines, or for use in less accurate machines wherein a small misalignment may occur between the shaft and the hole of the housing.

In accordance with the invention, this objective is achieved by providing rails which have supporting surfaces on each of their sides for the support of the rails on the inner surface of the hole of the housing, as well as a race for the loaded bearings of the respective rolling bearing rows. The support surfaces of the rails have the same shape on both of their sides. As a consequence, in the event of wear on the race of either side of the rail, the rail can be removed from the cage housing and rotated 180° for reinsertion in the cage housing so that an unused race on the other side of the rail may be employed to carry further loads. As a consequence, the useful life of the rail can be doubled.

In one embodiment of the invention, both sides of the rails have convex curvature in the lengthwise direction, so that a determined tilting movement of the rail in the housing is possible, and possible misalignment between the shaft and the boring of the housing can be compensated without the danger of harmful seizing in the bearing.

In another embodiment of the invention, both support surfaces of the rail are straight in the lengthwise direction, so that the inner surface of the boring of the housing provides a rigid support for the rail, and the rail is not tiltable in the housing. This arrangement is employed for rolling bearings for use in precision machines that do not require compensation for misalignment.

In accordance with the further feature of the invention, the support surfaces on both sides of the rail are shaped, in the circumferential direction, to closely engage the surface of the boring. For example, in a housing having a round bore, the support surfaces on both sides of the rail have convex curvature to closely fit the curvature of the boring. As a consequence, the surface of the boring provides a good under-support for the rails.

BRIEF FIGURE DESCRIPTION

In order that the invention will be more clearly understood, it will now be disclosed in greater detail with reference to the accompanying drawings, wherein.

DETAILED FIGURE DESCRIPTION

Figure 1:
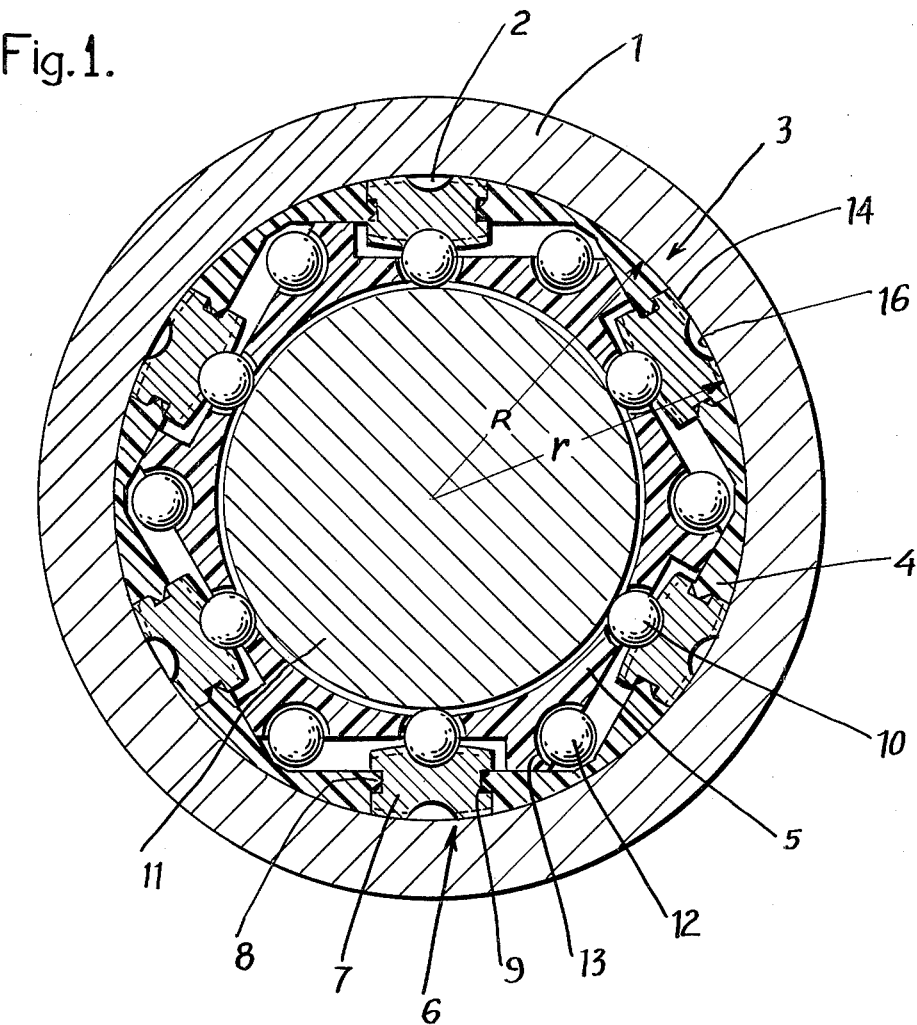
FIG. 1 is a transverse cross sectional view of a rolling bearing in accordance with one embodiment of the invention.

Referring now to the drawings, and more in particular to FIG. 1, therein is illustrated a rolling bearing in accordance with the invention, comprised of a housing 1 with a cylindrical boring 2 extending therein. The rolling bearing 3 is comprised of a cage having an outer cage part 4 and an inner cage part 5. These cage parts may be made of a plastic material, and are closely connected to one another in known manner by axially pushing them over one another in a cage shell. In the illustrated embodiment of the invention, six openings 6 are distributed about the outer cage part 4, and a separate rail 7, for example of steel, is positioned in each of these openings, the structure being arranged so that the rails may be radially snapped into the respective openings. For this purpose, projecting lugs 8 on the side walls of the openings 6 extend into opposed axially extending holding grooves 9 on both circumferentially directed lengthwise extending side edges of the rails 7. These lugs and grooves prevent the rails from falling out of the cage housing during the production of the rolling bearing. It is of course apparent that alternatively the lugs may be provided on the rails, with matching grooves being provided on the cage.

Six endless rolling body rows of spherical rolling elements are provided in the illustrated rolling bearing the rolling elements being distributed about the circumference of the cage housing consisting of the cage housing parts 4 and 5. Each rolling element row consists of a plurality of loaded rolling elements 10, which roll in the lengthwise direction between the shaft 11 and the corresponding rail 7, and a plurality of unloaded rolling elements 12 which are recirculated in the cage housing in the recirculation channels 13 provided between the cage housing parts 4 and 5.

Figure 2:
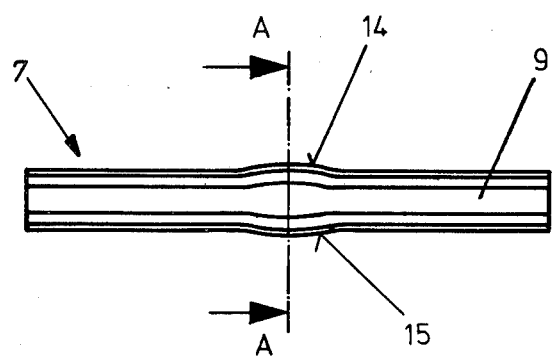
FIG. 2 is a side view of a rail of the rolling bearing of FIG. 1.
Figure 3:
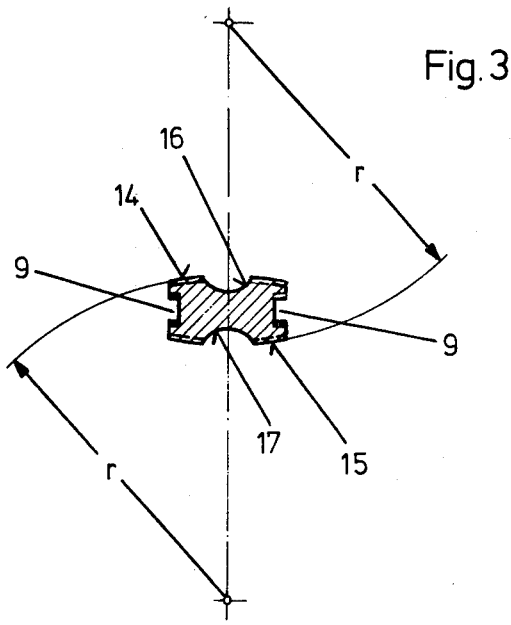
FIG. 3 is a transverse cross sectional view of the rail of FIG. 2, taken along the lines A—A.

As illustrated in FIGS. 2 and 3, each rail 7 has a support surface on both of the radially directed sides thereof, i.e., the sides 14 and 15. These support surfaces are provided for supporting the rail against the inner surface of the boring 2 of the housing 1, in the manner disclosed in the above-mentioned co-pending application. In addition, each support surface of the rail 7 has a groove shaped race for the loaded elements 10 of the respective rolling bearing roll. Thus, a race 16 is provided in the surface 14, and a race 17 is provided in the surface 15. Each support surface and race of the rail 7 has the same shape in the lengthwise direction, the rails shown in FIGS. 1 through 3 having a convex curvature in the lengthwise direction. In the cross sectional view illustrated in FIG. 3, the support surfaces 14 and 15 have convex transverse curvature, with a radius of curvature r. The radius of curvature r is of the same size or slightly smaller than the radius of curvature R of the cylindrical boring 2 of the housing, as is apparent in FIG. 1. As a consequence, the rail is shaped so that it may closely fit against the inner circumferential surface of the boring 2, in the circumferential direction.

In FIG. 1, the rails 7 of the rolling bearings 3 are shown with their support surfaces 14 directed radially outwardly to engage the inner surface of the boring, so that the loaded rolling elements 10 roll on the groove shaped races 17. In the event that it is desired to lengthen the useful life of the rail, for example as a result of wear or fatigue damage to the race 17, the rails may be removed from the housing, turned 180°, and re-snapped into the cage housing with their support surfaces 15 being directed radially outwardly. As a consequence, the support surfaces 15 will now engage the inner surface of the boring 2, and the rolling elements 10 under load will roll in the race 16. The reversible rails in accordance with the invention thereby double the useful life of the bearing.

As discussed above, in the arrangement of FIG. 1 the lengthwise convex curvature of the support surfaces 14 and 15 permit tilting movement of the rails in the boring 2 of the housing 1, so that small misalignment errors between the shaft 11 and the boring 2 are compensated.

Figure 4:
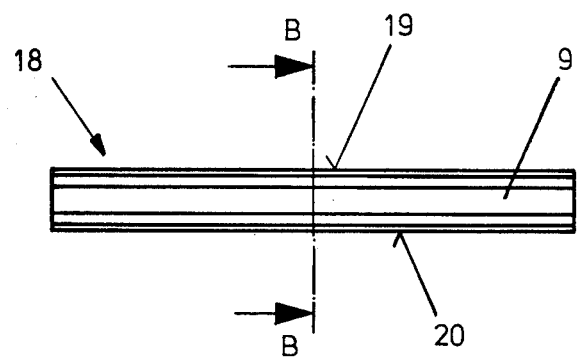
FIG. 4 is a side view of a rail for use in a modification of a rolling bearing in accordance with the invention.
Figure 5:
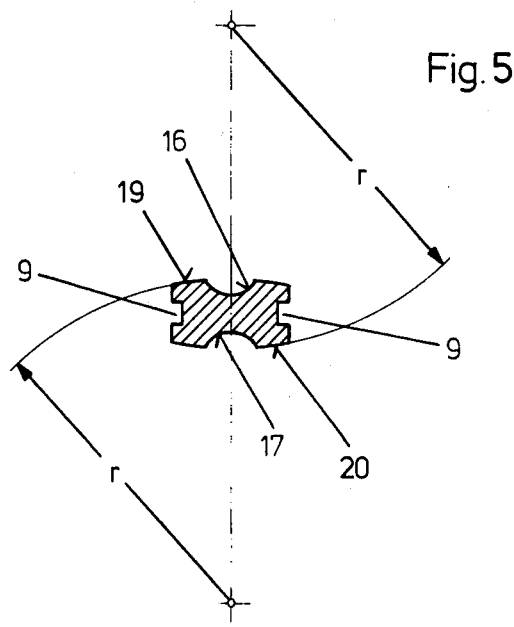
FIG. 5 is a transverse cross sectional view of the rail of FIG. 4, taken along the lines B—B.

FIGS. 4 and 5 illustrate a modification of the rails employed in a bearing in accordance with the invention. The rails of FIGS. 4 and 5 are adapted to be employed in a rolling bearing of the type illustrated in FIG. 1, to replace the lengthwise curved rails of FIG. 1. The rails of FIGS. 4 and 5 may thus be snapped into a cage of the type illustrated in FIG. 1, in place of the rails of FIGS. 2 and 3. As opposed to the form of the rails of FIGS. 2 and 3, the rails of FIGS. 4 and 5 have radially directed support surfaces 19 and 20 that extend straight in the lengthwise direction. The race 16 is provided in the support surface 19, and the race 17 is provided in the support surface 20. The opposite sides of the rail of FIGS. 4 and 5 have the same shape, and it is apparent that this rail is adapted to be fit into the rolling bearing so that it is rigidly and immovably held against the inner surface of the boring 2. As a consequence, a bearing employing the rails of FIGS. 4 and 5 has sufficient rigidity for use as a bearing for the exacting requirements of a precision machine.

If the grooved race 17 on one side of the rail 18 of FIGS. 4 and 5 show wear, the rail can be turned 180° in the cage housing, so that the unused race 16 may contact the loaded rolling elements 10, and the respective bearing can be used for a longer time in the same precision machine.

The rolling bearing in accordance with the invention thereby has the great advantage that it enables longer use of the rolling bearing. It can be employed either in a precision machine or in a less accurate machine with small misalignment between the shaft and the boring of the housing.

Figure 6:
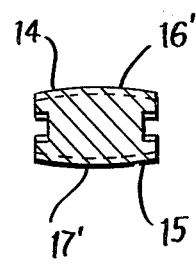
FIGS. 6 and 7 are transverse cross sections of modifications of the rails of FIGS. 3 and 5 respectively.
Figure 7:
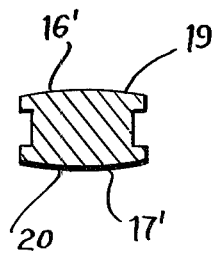

While the invention has been disclosed and described with reference to a limited number of embodiments, it will be apparent that variations and modifications may be made therein without departing from the spirit and scope of the invention. For example, the races can be formed with grooves of other shapes than as illustrated, or the races may be provided on the rails without grooves, i.e., the races extending directly along the supporting surfaces, as shown in FIGS. 6 and 7. In these figures, which correspond to FIGS. 3 and 5 respectively, the race surfaces 16' and 17' replace the race grooves 16 and 17 respectively, and may be formed with the same transverse convex curvature as the adjacent support surfaces. In addition, it is apparent that the separate cage parts 4 and 5 may alternatively be formed as a single cage part serving the function of the cage parts 4 and 5. It is intended in the following claims to cover each such variation and modification of the invention.

What is claimed:

1. In a rolling bearing for lengthwise movement between the rolling bearing and a shaft, wherein the rolling bearing has a housing with a boring, a plurality of endless rows of rolling elements each having a portion with rolling elements adapted to be radially loaded, a cage in said boring for guiding said rolling elements, and a plurality of race rails supported by said housing and positioned to radially outwardly support said rolling elements in said portion thereof, each race rail having a support surface and a race on its radially outer surface and its radially inner surface; the improvement wherein the radially inner surface and the radially outer surface of the race rails are identical in the longitudinal direction.

2. The rolling bearing of claim 1 wherein both the radially inner surface and the radially outer surface of the race rails are convex curved in the lengthwise direction.

3. The rolling bearing of claim 1 wherein the radially outer surface and radially inner surface of the race rails are straight in the lengthwise direction.

4. The rolling bearing of claim 1 wherein the radially inner surface and radially outer surface of the race rails have convex curved cross sections with radii of curvature substantially equal to the radius of curvature of the boring of said housing.

5. The rolling bearing of claim 1 wherein the races of said race rails comprise central longitudinally extending grooves in both the inner and outer radially directed surfaces thereof.

6. The rolling bearing of claim 1 wherein the radially inner and outer surfaces of said race rails have continuous convex curvature, whereby said races extend centrally along the respective convex curved surfaces of the rails.

7. In a rolling bearing for lengthwise movement between the rolling bearing and a shaft, wherein the rolling bearing has a housing with a boring, a plurality of endless rows of rolling elements each having a portion with the rolling elements adapted to be radially loaded, a cage in said boring for guiding said rolling elements, and a plurality of race rails supported by said housing and positioned to radially outwardly support said rolling elements in said portion thereof, said race rails having first and second sides directed in opposite radial directions, the outer portions of each of said first and second sides, in the circumferential direction, each having convex curvature with a radius substantially equal to the radius of said boring of said housing, whereby said race rails may be assembled in said bearing with either one of said first and second sides facing radially outwardly and engaging said boring of said housing, said race rails each being assembled in said housing with said one side thereof engaging said boring; the improvement wherein said first and second sides of said race rails have substantially the same shape in the lengthwise direction thereof.

8. The rolling bearing of claim 7 wherein said first and second sides have convex curvature in the lengthwise direction of said rolling bearing.

9. The rolling bearing of claim 7 wherein said first and second sides are straight in the lengthwise direction of said rolling bearing.

10. In a rolling bearing for lengthwise movement between the rolling bearing and a shaft, wherein the rolling bearing has a housing and a boring, a plurality of endless rows of rolling elements each having a portion with the rolling elements adapted to be radially loaded, a cage in said boring for guiding said rolling elements, and a plurality of race rails, supported by said housing and positioned to radially outwardly support said rolling elements in said portion thereof, said race rails having a first side defining first races and a second side opposite said first side defining second races, the outer portions of each of said first and second sides, in the circumferential direction of said bearing, each having convex curvature with a radius essentially equal to the radius of said boring in said housing, whereby said race rails may be assembled in said bearing with either one of said first and second sides stationed radially outwardly and engaging said boring of said housing, said race rails being assembled in said housing with said one side thereof engaging said boring; the improvement wherein said first and second sides have substantially the same shape in the lengthwise direction thereof, whereby said first and second sides are mutually interchangeable in said bearing without changing the characteristics of said bearing.

* * * * *